(12) United States Patent
Itzler

(10) Patent No.: US 9,596,421 B1
(45) Date of Patent: Mar. 14, 2017

(54) APPARATUS COMPRISING A HIGH DYNAMIC RANGE SINGLE-PHOTON PASSIVE 2D IMAGER AND METHODS THEREFOR

(71) Applicant: Princeton Lightwave, Inc., Cranbury, NJ (US)

(72) Inventor: Mark Allen Itzler, Princeton, NJ (US)

(73) Assignee: Princeton Lightwave, Inc., Cranbury, NJ (US)

( * ) Notice: Subject to any disclaimer, the term of this patent is extended or adjusted under 35 U.S.C. 154(b) by 0 days.

(21) Appl. No.: 14/158,511

(22) Filed: Jan. 17, 2014

Related U.S. Application Data

(60) Provisional application No. 61/753,582, filed on Jan. 17, 2013.

(51) Int. Cl.
*H04N 5/369* (2011.01)
*H04N 5/378* (2011.01)

(52) U.S. Cl.
CPC ............ *H04N 5/369* (2013.01); *H04N 5/378* (2013.01)

(58) Field of Classification Search
CPC .. H01L 27/14643; H01L 27/00; H01L 27/146
USPC .................................... 250/370.01
See application file for complete search history.

(56) References Cited

U.S. PATENT DOCUMENTS

| 2005/0012033 A1* | 1/2005 | Stern et al. ............... 250/214 R |
| 2009/0236501 A1* | 9/2009 | Takahashi et al. ........ 250/214 R |
| 2010/0019128 A1* | 1/2010 | Itzler ........................ 250/208.1 |
| 2010/0053594 A1* | 3/2010 | Yuan et al. .................. 356/5.01 |
| 2011/0169117 A1* | 7/2011 | McIntosh et al. ............ 257/432 |
| 2012/0057059 A1* | 3/2012 | Eldesouki et al. ............ 348/302 |
| 2013/0221221 A1* | 8/2013 | Bouzid et al. ............. 250/338.4 |
| 2014/0332668 A1* | 11/2014 | Nishihara et al. ....... H04N 5/32 250/208.1 |

FOREIGN PATENT DOCUMENTS

JP 2011270240 * 9/2011

OTHER PUBLICATIONS

Mark A. Itzler, et al., "Comparison of 32 x 128 and 32 x 32 Geiger-mode APD FPAs for single photon 3D LADAR imaging", 2011, pp. 1-12, vol. 8033, No. 80330G, Publisher: Advanced Photon Counting Techniques V, Published in: US.

(Continued)

*Primary Examiner* — Marcus Taningco
(74) *Attorney, Agent, or Firm* — Kaplan Breyer Schwarz & Ottesen, LLP

(57) ABSTRACT

A method for computing the intensity of light incident on a photodiode capable detecting single photons comprises using arrival-time statistics for a plurality of detected single photons. The statistics are based on the determination of the arrival time for each detected photon relative to the beginning of a detection period within an image frame in which the photon is detected. In some embodiments, Poisson statistics are applied to the computation of the intensity. By computing the intensity of light in this manner for each of plurality of single-photon photodetectors that compose a focal plane array, a high-contrast image of a scene can be developed.

28 Claims, 7 Drawing Sheets

(56) References Cited

OTHER PUBLICATIONS

Mark A. Itzler, et al., "Design and performance of single photon APD focal plane arrays for 3-D LADAR imaging", "http://spiedl.org/terms Downloaded from SPIE Digital Library on Aug. 17, 2010 to 128.59.62.83. Terms of Use: ", 2010, pp. 1-15, vol. 7780, No. 77801M-2, Publisher: Invited Paper, Published in: US.

Mark Entwistle, et al., "Geiger-mode APD Camera System for Single Photon 3-D LADAR Imaging", "www.princetonlightwave.com", 2012, pp. 1-12, vol. 8375, No. 83750D, Publisher: Advanced Photon Counting Techniques VI, Published in: US.

\* cited by examiner

APPARATUS COMPRISING A HIGH DYNAMIC RANGE SINGLE-PHOTON PASSIVE 2D IMAGER AND METHODS THEREFOR

STATEMENT OF RELATED CASES

This case claims priority of U.S. Provisional Patent Application Ser. No. 61/753,582, filed Jan. 17, 2013, which is incorporated herein by reference.

FIELD OF THE INVENTION

The present invention relates to imaging systems in general, and, more particularly, to single-photon 2d imaging systems.

BACKGROUND OF THE INVENTION

Capturing high-quality images using reflected ambient light involves two fundamental challenges: (i) detecting optical intensities as low as a single photon, and (ii) detecting photons over a wide dynamic range of optical intensities. To detect single photons with high fidelity (i.e., a high signal-to-noise ratio [SNR]), a detector must provide a large electrical gain in the optical-to-electrical conversion process. In essentially all semiconductor photodetectors of visible and infrared light, each incident photon creates a single photo-excited electron via the photoelectric effect. Some prior-art technologies can achieve high gain by amplifying each single photo-excited electron; for instance, image-intensifier tubes exploit microchannel plates to obtain $10^4$-$10^6$ electrons for each incident photon. However, such large gains often give rise to saturation effects in the presence of larger optical input signals thereby limiting the dynamic range of such imagers.

Other prior-art technologies employ a much lower gain-conversion process (often limited to unity gain) and obtain measurable output signals by integrating photo-excited charge for a sufficiently long period of time. These integration strategies often involve the collection of charge on a capacitive circuit element. Thermal fluctuations give rise to noise associated with electrons that are randomly moving on to and off of integration capacitors, and for practical (i.e., non-cryogenic) operating temperatures, these imagers have sensitivities limited to values well above the single-photon limit. Moreover, the finite size of these integration capacitors establishes a constraint on the dynamic range of the signals that can be recorded during each integration cycle.

The family of semiconductor photodetectors known as avalanche photodiodes (APDs) provides optical-to-electrical gain by exploiting carrier multiplication through the impact ionization process. The APD is designed so that photo-excited charges induced in the absorption region of the device are injected into a multiplication region where they are accelerated by a large electric field. When an injected charge reaches a sufficiently high kinetic energy, it can generate an electron-hole pair through an inelastic collision with lattice atoms in a process referred to as "impact ionization." These newly liberated carriers are then also accelerated, and the process continues to create an "avalanche" of charge until all carriers have exited the high-field multiplication region of the device.

At sufficiently large electric-field intensity, known as the "avalanche breakdown field," there is a finite probability that the avalanche multiplication process can lead to a self-sustaining avalanche. By applying a field larger than the breakdown field, the APD is operated in a metastable state in which the injection of a single photo-excited charge can trigger the development of an easily detectable macroscopic pulse of charge in an extremely short (<1 nanosecond) avalanche build-up period. This so-called "Geiger-mode" operation can provide high-efficiency detection of single photons, and devices operated in this regime are referred to as Geiger-mode avalanche photodiodes (GmAPDs).

GmAPDs have been used in each pixel of a focal-plane array to create imagers with single-photon sensitivity. One prior-art approach uses these GmAPD arrays to count every time a photon strikes a given pixel to build an intensity image based on the number of counts per pixel in a given integration time. This approach is essentially a digital analogue to less sensitive analog imagers that operate based on capacitive integration of photo-induced current. Although this approach achieves single-photon sensitivity, its dynamic range is constrained by a significant limitation of all GmAPDs demonstrated to date. Namely, during each detection avalanche event, some fraction of the induced charges can be trapped at defects in the multiplication region. These trapped charges are released by thermionic emission from the trap sites. If the device is re-armed while trapped charges are still being released, they can initiate additional avalanches causing false detection events known as "after-pulses." Following the detection of a single photon, therefore, GmAPDs require an appreciable "dead time" before re-arming of the device to avoid afterpulses.

The probability of after-pulse counts can be reduced by limiting the amount of charge that flows with each avalanche event, but the avalanche charge per detection event must remain large enough that it can be reliably detected by appropriate digital threshold circuits. Therefore, even in ideally designed detectors, there will always be a trade-off between after-pulse minimization and detection efficiency. The result of this trade-off is that the dead-time required between single photon detection events leads to a hard limit on the dynamic range of a single GmAPD pixel.

SUMMARY OF THE INVENTION

The present invention avoids some of the drawbacks of the prior art and enables high dynamic range 2d-imaging using a sensor comprising a focal plane array of single-photon photodetectors. The present invention mitigates limitations on dynamic range due to after-pulsing effects, as exhibited by some prior-art single photodetectors. This is accomplished by exploiting knowledge about the arrival time of a photon within each of a plurality of detection frames at each pixel of a focal-plane array of single-photon photodetectors. Embodiments of the present invention are particularly well suited for applications such as near-infrared imaging, low-light imaging, and the like.

Some embodiments of the present invention comprise a camera including a single-photon passive 2d-imager. The single-photon passive 2d-imager includes a photodiode focal plane array as well as software, a power source, and processing capabilities for generating an image. Some of the key elements of the photodiode focal plane array include:
  an array of photodiodes, each of the photodiodes capable of single photon detection;
  an array of lenses for focusing incoming photons onto the photodiodes;
  a read out integrated circuit ("ROIC") including threshold detection and timing circuitry capable of acquiring data, on a pixel-by-pixel basis, about (i) the number of photons received by each individual photodiode and (ii) precisely when photons are received by each individual photodiode.

In operation, a gating signal, typically in the form of a periodic voltage, is applied to each pixel in the array of photodiodes. Each period of the gating signal defines a detection frame. Each detection frame includes a detection period and a reset period. During each detection period, the photodetector is "armed," wherein it is capable of detecting a photon. During the reset period, the photodetector is not capable of detecting a photon. In a typical embodiment, both the detection period and the reset period are 5 microseconds. An image frame consists of a number of detection frames, as provided by the gating signal. For example, in some embodiments, an image frame consists of 1000 detection frames.

The detection and timing circuitry in the ROIC obtains photon count data and timing information about photon arrival on a time scale this is shorter than the duration of a detection frame. In accordance with the present teachings, the intensity of light incident on a pixel during an image frame is determined via:

(i) the number of photons counted during the image frame; or (ii) the arrival times of photons in the detection frames that compose the image frame; or (iii) both (i) and (ii).

More particularly, statistical analysis of the measured arrival times (e.g., determination of the average photon arrival time, distribution of the photon arrival times, other properties of the photon arrival times, etc.) is used as a basis for determining light intensity. It is an aspect of the present invention that methods employing Poisson statistics can be used to accurately determine photon arrival times.

The duration of each detection period and reset period is dependent upon the constraints of the application and the length of these periods involves a trade-off between detection efficiency and reducing the number of after-pulses. In the prior-art, this trade-off limits the dynamic range of a pixel due to the resultant dead time necessary between detections of single photons. Embodiments of the present invention substantially circumvent this limitation by using, as appropriate, both the number of photons that arrive per pixel in an image frame, as well as information about when the detected photons arrive, to determine light intensity.

In the illustrative embodiment, the photodiodes in the photodiode array are avalanche photodiodes physically configured for single-photon detection and operated in Geiger mode (i.e., GmAPDs). It is to be understood, however, that detectors other than GmAPDs that are capable of single-photon detection are acceptable for use in conjunction with the present invention. For example and without limitation, superconducting detectors, linear mode APDs, p-i-n detectors, and cryogenically cooled p-i-n detectors are capable of single-photon detection and suitable for use in embodiments of the present invention.

In some embodiments, the invention provides an apparatus comprising a single-photon passive 2d-imager comprising:

a plurality of single-photon photodetectors; and circuitry for determining, for each single-photon photodetector of the plurality thereof, arrival time of a photon received thereby.

In some additional embodiments, the invention provides a method for determining an intensity of light incident on a single-photon photodetector, wherein the method comprises:

providing a single-photon photodetector;

biasing the single-photon photodetector with a gating voltage, the gating voltage including a plurality of detection periods, wherein an integer number of detection periods collectively define an image period;

determining an arrival time for each of a plurality of single photons received at the single-photon photodetector, wherein each of the plurality of single photons is detected within a different one of the plurality of detection periods; and computing the intensity based on statistics of the arrival times of the plurality of single photons.

In yet some further embodiments, the invention provides a method for computing an image of a scene, the method comprising:

providing a photodiode focal-plane array having a first pixel and a second pixel, the first pixel comprising a first single-photon photodetector and the second pixel comprising a second single-photon photodetector;

biasing the first single-photon photodetector with a periodic gating signal, wherein the gating signal a single period of the gating signal defines a detection frame and a plurality of detection frames defines an image frame;

biasing the second single-photon photodetector with the gating signal;

receiving light comprising a first plurality of single photons at the first single-photon photodetector during the image frame;

receiving light comprising a second plurality of single photons at the second single-photon photodetector during the image frame;

determining an arrival time for each of the first plurality of single photons, wherein each of the first plurality of single photons is detected within a different one of the plurality of detection frames;

computing a first intensity for the light received at the first single-photon photodetector during the image frame, the first intensity being based on statistics of the arrival times of the first plurality of single photons;

computing a second intensity for the light received at the second single-photon photodetector during the image frame, the second intensity being based on statistics of the arrival times of the second plurality of single photons; and determining an intensity contrast between the light received at the first single-photon photodetector and the second single-photon photodetector during the image frame.

DETAILED DESCRIPTION

As previously indicated, embodiments of the present invention utilize single-photon photodetectors. In the illustrative embodiment disclosed herein, the single-photon photodetectors are Geiger-mode avalanche photodiodes (GmAPDs). It is to be understood that this disclosure, including the discussion of the "theory of operation," fully applies to photodetectors other than GmAPDs that are capable of detecting a single photon and that such photodetectors are suitable for use in embodiments of the invention.

The following terms are explicitly defined for use in this disclosure and the appended claims as follows:

- A "passive 2d-imager" is an apparatus capable of passively imaging a scene. Fundamentally, it is distinguished from a 3d-imager in that the 3d-imager incorporates a light source (e.g., laser, LED, etc.) that is synchronized to the operation of the camera and the passive 2d-imager does not include such a light source. The 3d-imager includes a light source so that the position of elements in a scene can be determined via differences in the round trip times of photons originating from the light source, which is at a precisely known location and the light is emitted as a precisely known time. The passive 2d-imager simply receives photons from a "scene," such as from sunlight reflected off of objects in the scene. A passive 2d-imager includes a photodiode focal plane array as well as software, a power source, and processing capabilities for generating an image.
- A "single photon photodetector," and inflected forms thereof, is a photodetector physically adapted to give rise to a macroscopically detectable current upon receipt of a single photon.
- A "photodiode focal plane array" comprises, among other elements, an array of photodiodes, an array of micro lens for focusing photons onto the photodiodes in the area, a read-out integrated circuit ("ROIC").
- A "GmAPD focal plane array" is a photodiode focal plane array wherein the photodiodes are Geiger-mode avalanche photodiodes (GmAPDs).
- A "photodiode array" comprises an array of photodiodes.
- A "GmAPD array" is a photodiode array wherein the photodiodes are Geiger-mode avalanche photodiodes (GmAPDs).
- A "pixel" is a basic unit of an array. In the context of a photodiode array, the term "pixel" references a single photodiode of the array. In the context of a photodiode focal plane array, the term "pixel" collectively references a single photodiode in the photodiode array and a pixel in the ROIC, at a minimum. In the illustrative embodiment, there is a one-to-one correspondence between pixels in the photodiode array and pixels in the ROIC.

Figure 1:
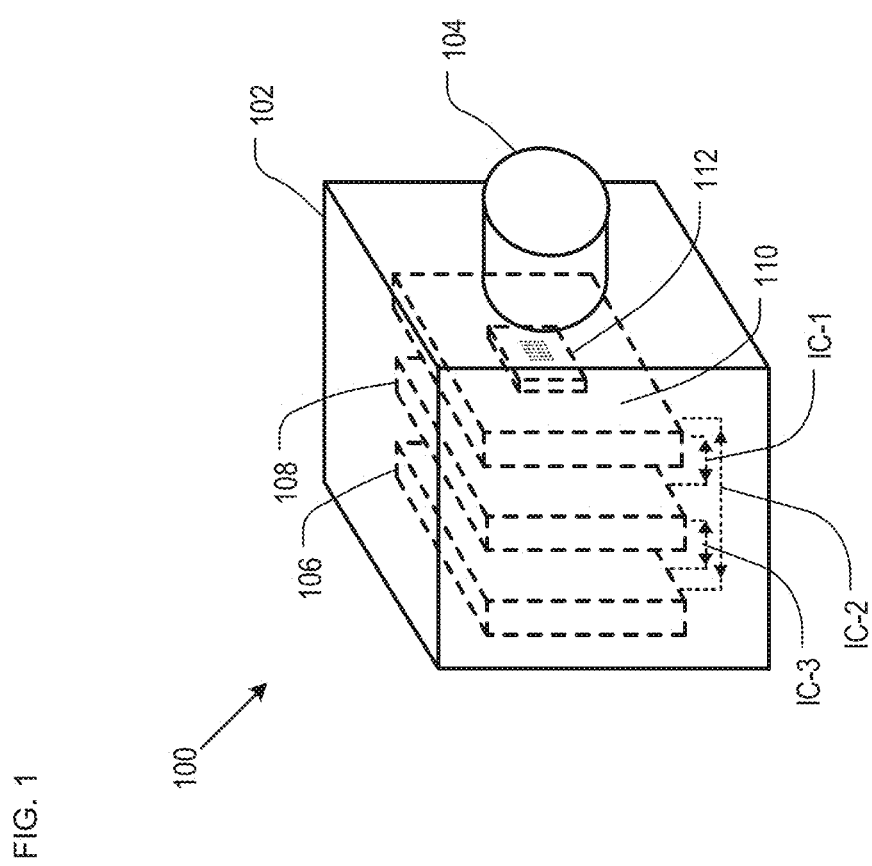
FIG. 1 depicts a camera comprising a single-photon passive 2d-imager in accordance with the illustrative embodiment of the present invention.

FIG. 1 depicts camera 100. The camera includes housing 102, imaging lens 104, and a 2d2d passive imager, which in the illustrative embodiment, is embodied in three boards 106, 108, and 110, as well as an external computer (not depicted) in view of processing (i.e., speed and storage) requirements.

The three boards are contained within housing 102. Board 106 serves as an interface, providing, for example, the industry standard CameraLink™ interface to a system computer, power regulation, and external clock and trigger inputs. Board 108 contains a field-programmable gate array ("FPGA") and a microcontroller that provides various functionality through firmware programming. Board 110 contains GmAPD focal plane array 112 and appropriate circuitry/equipment for power and temperature regulation of same. Imaging lens 104, which is external to housing 102, images a scene onto focal plane array 112. Boards 106, 108, and 110 are interfaced to one another for the exchange of data, etc., as represented by interconnect lines IC-1, IC-2, and IC-3. It will be understood that there are more than three interconnects for data exchange; interconnects IC-1, IC-2, and IC-3 are each representative of a plurality of connections for transmitting data between the equipment on the three boards 106, 108, and 110.

The Geiger-Mode APD Focal Plane Array.

Figure 2:
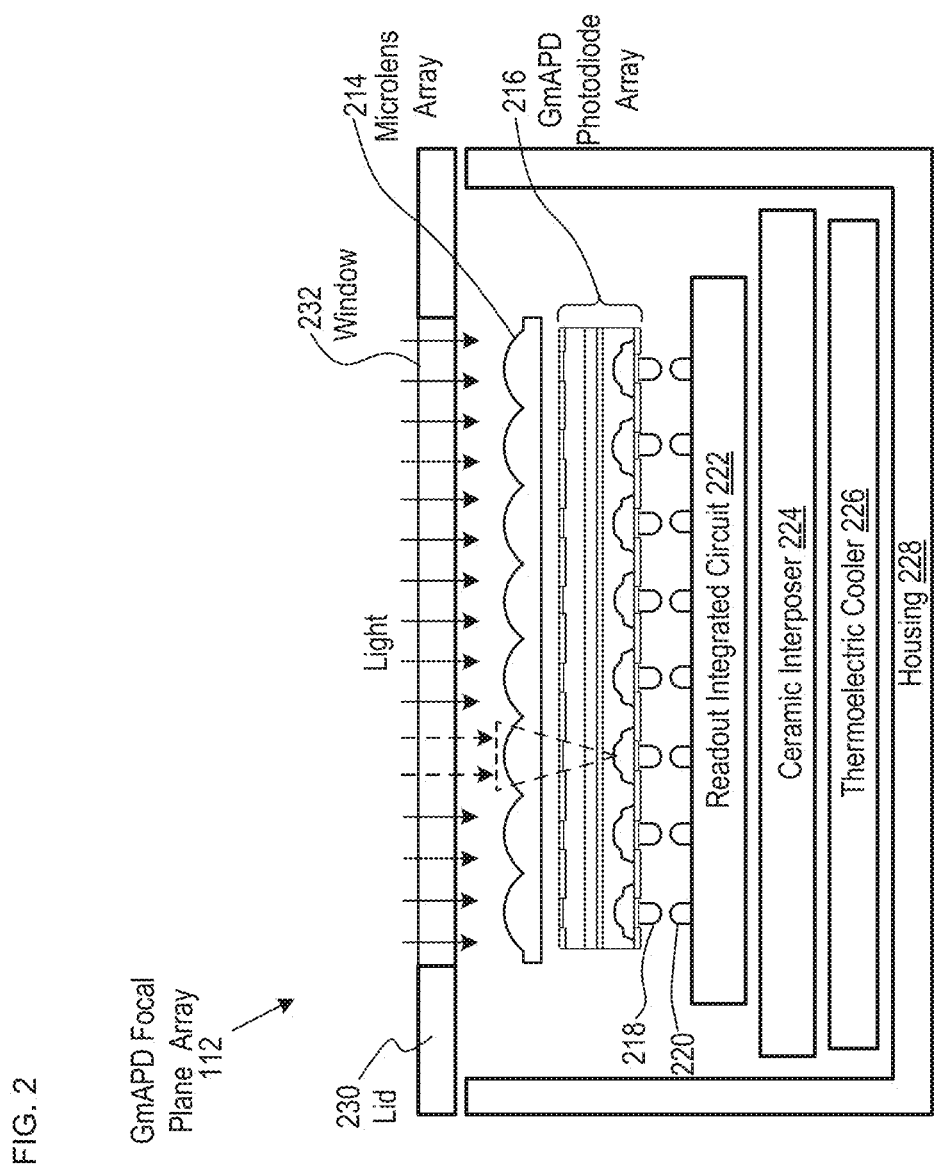
FIG. 2 depicts a GmAPD focal plane array for use in the single-photon passive 2d-imager.

FIG. 2 depicts further detail of GmAPD focal plane array 112. In the illustrative embodiment, the GmAPD focal plane array is a stack of structures, including micro lens array 214, GmAPD array 216, read-out integrated circuit ("ROIC") 222, interposer board 224, and thermoelectric cooler 226. The stack of structures is contained in housing 228, which is hermetically sealed via lid 230. A scene is imaged onto the array 216 through window 232 in lid 230. In some embodiments, window 232 comprises sapphire and includes an anti-reflection coating.

Micro lens array 214 focuses photons passing through window 232 onto the active region of GmAPDs in array 216, effectively increasing the fill factor thereof.

A Geiger-mode avalanche photodiode (GmAPD) is well known in the art; a schematic cross section of a planar GmAPD suitable for use in conjunction with embodiments of the invention is shown, for example, in Entwistle et al., "Geiger-mode APD Camera System for Single Photon 3-D LADAR Imaging," *Proc. of SPIE*, vol. 875, 83750D-1 (2012), which is incorporated by reference herein.

Briefly, the GmAPD has absorption and multiplication regions. The composition of the absorption region can be optimized for the detection of photons having a specific wavelength. For example, in some embodiments in which it is desirable to optimize the GmAPD for the detection of photons having a wavelength of 1.06 microns (µm), the absorption layer is a quaternary layer of InGaAsP ($E_g$~1.03 eV). In some embodiments in which it is desirable to optimize the GmAPD for the detection of photons having a wavelength of 1.55 µm, the absorption layer is a ternary layer of InGaAs ($E_g$~0.75 eV).

The absorption layer is spatially separated from the avalanche multiplication layer, which comprises an InP region having a wider bandgap ($E_g$~1.35 eV) than the absorption layer. A primary goal of this design—the separation of the absorption and multiplication regions—is to maintain low electric field in the narrower bandgap absorber while maintaining sufficiently high electric field in the multiplication region. The intent of the low electric field is to avoid dark carriers due to tunneling and the intent of the high electric field is to promote significant avalanche multiplication from impact ionization.

The creation of a single electron-hole pair by photoexcitation in the absorption layer results in the injection of the hole into the high-field InP multiplication region in which impact ionization occurs and results in avalanche gain. With the GmAPD biased above breakdown voltage $V_b$ in its armed state, the resulting avalanche give s rise to a macroscopic current pulse that is sufficiently large to be sensed by a threshold detection circuit (contained in the readout integrated circuit).

The APD includes a buried p-n junction to guarantee edge breakdown suppression, low perimeter leakage, and high reliability. The active area of the planar APD is determined by patterning of a SiN dielectric passivation layer to create a diffusion mask for subsequent diffusion of Zn dopant atoms to create a p$^+$ InP region with the i-InP cap layer. To suppress electric field enhancement at the edge of the planar APD structure, two diffusions are used to tailor the p-n junction profile so that the junction is deeper in the central part of the active area than it is in the junction periphery. This ensures that the gain profile across the center part of the active region is uniform and that the gain is reduced in the peripheral region of the device.

Figure 3:
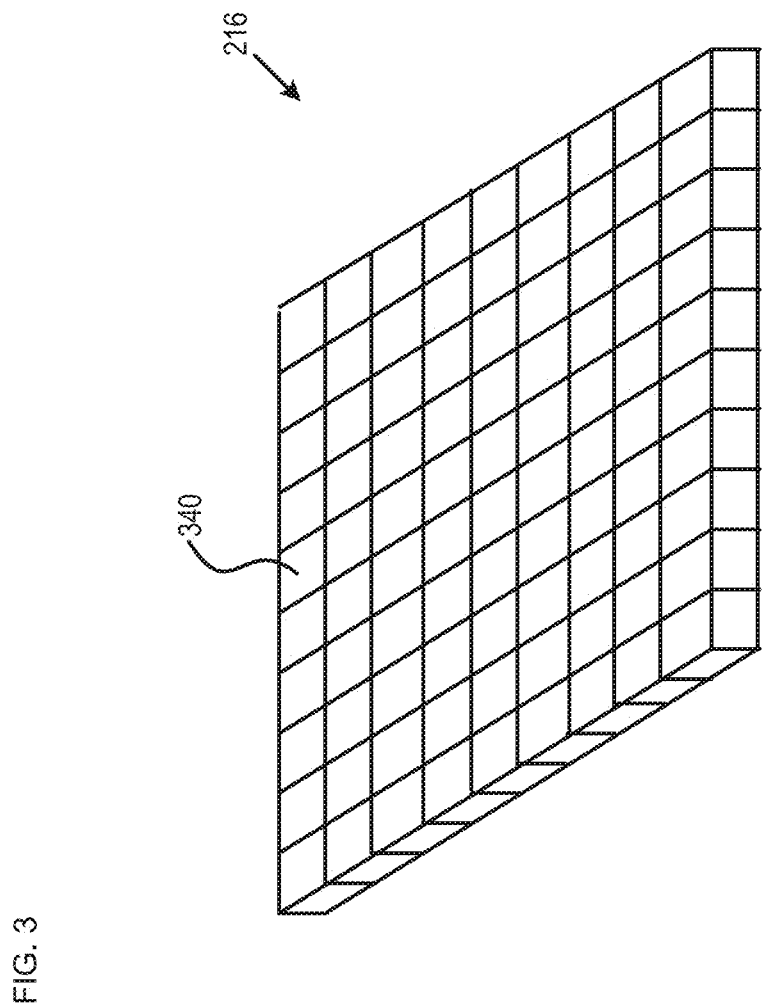
FIG. 3 depicts a photodiode array of the GmAPD focal plane array of FIG. 2.

FIG. 3 depicts an illustrative photodiode array 216 comprising a plurality of substantially identical pixels 340, each of which, in the illustrative embodiment, is an individual GmAPD. In some embodiments, each pixel 340 is capable of detecting near infrared light. In some other embodiments, at least one pixel 340 includes a GmAPD suitable for detecting light having a wavelength within a range other than the near infrared wavelength range. In some embodiments, at least one pixel 340 comprises a photodetector, other than a GmAPD, which is capable of detecting single photons. Photodetectors suitable for use in pixel 340 include, without limitation, superconducting detectors, linear mode APDs, p-i-n detectors, cryogenically cooled p-i-n detectors, and the like.

For clarity, FIG. 3 depicts a 10×10 array of pixels; in embodiments of the invention, GmAPD arrays are typically larger. For example, in some embodiments of the invention, GmAPD array 216 is configured as a 32×32 pixel array, wherein the diameter of the optically active region of each pixel is 34 μm. In some further embodiments of the invention, the GmAPD array is configured as a 32×128 pixel array, wherein the diameter of the optically active region of each pixel is 18 μm. Those skilled in the art will appreciate photodiode arrays having a different number of pixels may suitably be used in conjunction with still further embodiments of the invention.

Returning again to FIG. 2, ROIC 222 is configured as having a number of pixels corresponding, on a one-to-one basis, with pixels 340 of GmAPD array 216. A threshold detection circuit exists within each pixel of the ROIC, such that the detection circuit triggers when an avalanche event occurs in the corresponding pixel of GmAPD array 216. The detection event, as obtained via the detection circuitry, forms the basis for the photon count and arrival information that is used in accordance with the present invention.

Each pixel of ROIC 222 additionally incorporates clock circuits that allow for precise determination of the time of an avalanche event in the GmAPD and memory functionality for recording the time of the event. Those skilled in the art will know how to implement and use such clock circuits and memory functionality in the ROIC and/or associated electronics/circuitry.

Interposer board 224, which in some embodiments comprises a ceramic, provides routing of electrical signals from ROIC 222 to electrical interconnection pins (not shown) of housing 228. Thermoelectric cooler 226 maintains the temperature of the various elements of GmAPD focal plane array 112 at desired set point(s).

GmAPD focal plane array 112 is assembled as follows. The GmAPD array 216 is attached to ROIC 222 via indium bumps 218 and 220 in known fashion (i.e., indium bump hybridization). Micro lens array 214, which can be formed of GaP, is aligned with and attached to the exposed back surface of GmAPD array 216 via an optical epoxy. Interposer 224 is then attached to ROIC 222. Thermoelectric cooler 226 is attached to housing 228. Interposer 224 is then placed on thermoelectric cooler 226 and attached thereto. In some embodiments, a heat sink (not depicted), such as a block of CuW, is applied to at least a portion of the exterior surface of housing 228.

Theory of Operation.

It will be instructive, prior to discussing methods of operation, to present the theory underlying those methods. As previously indicated, among any other benefits and objectives, embodiments of the invention provide a way to circumvent the inherent limitation on the dynamic range of imagers imposed by after-pulsing effects. Simply stated, this is accomplished by: (i) counting how many photons arrive per pixel per imaging frame, and (ii) exploiting knowledge about when photon arrivals occur within the imaging frame.

A typical InGaAs/InP GmAPD can be reset following a ~5 microsecond (μs) dead time imposed after each avalanche detection event with minimal after-pulsing probability (e.g., <<1%). Assuming that the detection period during which the pixels are armed is also 5 μs, the imager can be operated with 10 μs "detection frames". By way of illustration, 1000 of these detection frames are averaged to provide a single "image frame." Based on a 10 μs detection frame, image frames can be collected at a rate of 100 Hz. Noise counts will occur due to thermally excited or electric field-mediated carrier creation that can give rise to avalanches even in the absence of photon arrivals. The average value of these "dark counts" can be subtracted from the photon count signal, but fluctuations in this dark count rate result in a "shot" noise that cannot be eliminated from the measured signal. Assuming InGaAsP GmAPD dark count rates on the order of about 5 kHz, the dark count probability during each 5 μs detection period will be 0.025. In each image frame of 1000 detection periods, there will be, therefore, 25 dark counts per pixel on average. The associated shot noise is given by the square root of this dark count value (e.g., about 5). With 5 noise counts, to obtain an SNR of at least 2 or more, the dynamic range of each image frame will be limited to about 100 based on simply counting detection events for 1000 detection frames.

In embodiments of the present invention, the dynamic range of the imager is increased dramatically by capturing timing information about when photon detections occur within each detection frame. To obtain quantitative information, certain assumptions concerning the statistics describing photon arrivals at each pixel of the imager are made. It can be shown that in many scenarios, Poisson statistics provide a faithful description of photon arrivals, and in some embodiments, Poisson statistics are applied.

Based on the required dead time following a GmAPD detection event, it is assumed that there can be at most one detected event per pixel per detection frame. It is assumed that photons arrive at a given pixel with an average rate λ and that the detection frame duration is "T". As discussed below, it can be assumed without loss of generality that single photons are detected with perfect quantum efficiency. For a Poisson process, the probability of zero arrivals within time T is $e^{-\lambda T}$. Therefore, the probability that at least one photon arrives and is counted within time T is $P_c = 1 - e^{-\lambda T}$.

The average arrival rate λ at each pixel corresponds to the absolute intensity at this pixel. Solving for λ:

$$\lambda = -T^{-1} \ln(1-P_c) \quad [1]$$

In the limit of very low flux, $\lambda \sim P_c/T$. In other words, as expected, the optical intensity is proportional to the number of counts observed. In the limit of very high flux, however, a count is obtained for every detection frame and no contrast information is obtained from the count data.

However, for high flux situations, information about the input optical intensity can be extracted by analyzing the photon arrival timing information obtained from all 1000 detection frames at a given pixel. For a Poisson process, with observations beginning at time t=0, the probability of a photon arriving at time t is given by $f(t)=\lambda e^{-\lambda t}$. Integrating f(t) from t=0 to t=T provides the average arrival time for detection frames of duration T:

$$t_{avg} = \frac{\int_0^T t f(t) dt}{\int_0^T f(t) dt} = \frac{\int_0^T t e^{-\lambda t} dt}{\int_0^T e^{-\lambda t} dt} = \frac{\lambda^{-1}[1-(\lambda T+1)e^{-\lambda T}]}{1-e^{-\lambda T}} = \lambda^{-1}\left[1 - \frac{\lambda T}{e^{\lambda T}-1}\right] \quad [2]$$

Expression [2] is used to determine the average photon arrival rate λ—the optical intensity—by simply measuring the average arrival time $t_{avg}$. In a camera-based imager, this can be implemented using a look-up table contained within electronic circuits such as field-programmable gate arrays.

The physical implications of this result for $t_{avg}$ can be appreciated by considering the low and high flux limits. In the low flux limit (i.e., λT<<1), expanding the exponential on the right-hand side of Expression [2] to second order terms in λT provides the result:

$$t_{avg} = T/2 \quad [3]$$

In this case, the inverse of the average arrival rate ($\lambda^{-1}$) corresponds to a time so much longer than the detection frame duration T that detection events are uniformly distributed within T and have an average value of T/2.

In the high flux limit (i.e., λT>>1), Expression [2] reduces to:

$$t_{avg} = \lambda^{-1} - (Te^{-\lambda T}) \quad [4]$$

In this case, the average arrival time is essentially the inverse of the average arrival rate ($\lambda^{-1}$) with a small correction term corresponding to the small number of counts that would have occurred for times longer than the detection frame duration T.

The limitation on the dynamic range in the high flux limit is determined by the resolution with which photon arrival times can be measured. In prior-art focal plane arrays designed for laser radar 3-D imaging, timing circuits integrated into each pixel of the imager are synchronized to an emitted nanosecond-scale laser pulse to measure the round-trip time-of-flight to distant objects to be imaged. This timing information allows the distance of reflections from objects in the scene to be determined. This range information from each pixel is used as the third dimension for creating 3d images. For this 3d imaging application, focal planes with sub-nanosecond (ns) timing capability have been demonstrated. See, for example, M. A. Itzler, et al., "Design and performance of single photon APD focal plane arrays for 3-D LADAR imaging," *Proc. of SPIE* 7780, 77801M (2010), which is incorporated by reference herein. Thus, for the high dynamic range single-photon passive imaging technique described in this Specification, the determination of average arrival times on the order of a few nanoseconds can be readily accomplished.

Figure 4:
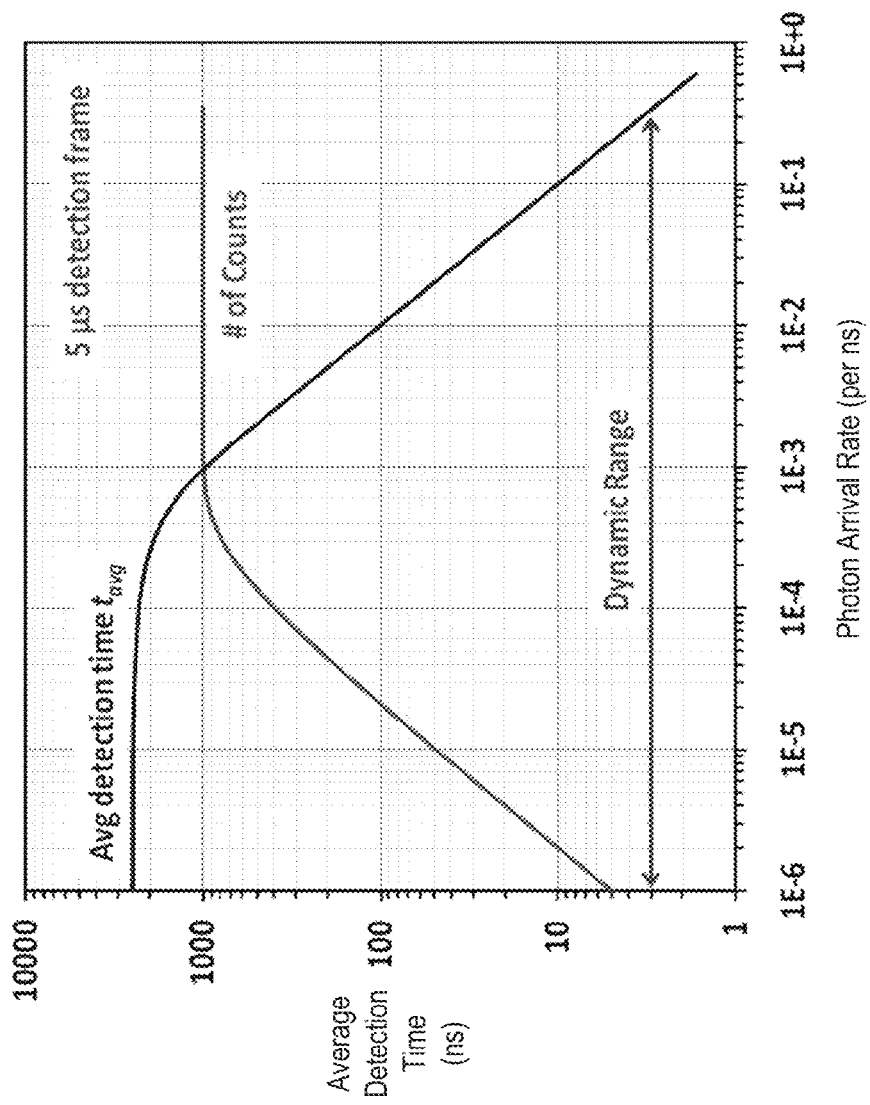
FIG. 4 depicts a plot of dynamic range for a single-photon passive 2d-imager in accordance with the illustrative embodiment of the present invention.

FIG. 4 depicts a plot of dynamic range for a single-photon passive 2d-imager in accordance with the illustrative embodiment of the present invention. As shown in FIG. 4, intensity can be accurately determined over more than five orders of magnitude by combining the counting information described by Expression [1] with the timing information described by Expression [2]. This enormous dynamic range is achieved using GmAPD imaging pixels that also provide true single-photon sensitivity in the low-flux limit. This illustration assumes 1000 detection frames, where each detection frame has a duration of 5 μs.

For low flux arrival rates less than ~1E-4 ns$^{-1}$ per pixel, the fraction of detected counts varies linearly with the intensity. For high flux arrival rates greater than ~1E-3 ns$^{-1}$ per pixel, the average detection time varies inversely with the intensity. For the intermediate flux range of ~1E-4-1E-3 ns$^{-1}$, combining both count and timing data can provide an accurate determination of the input intensity.

It is important to also consider that, as with essentially all other photon detectors, GmAPDs do not provide perfect quantum efficiency. Instead, they have a probability D<1 of detecting any given photon that is incident on the detector, where D generally ranges from 0.05 to 0.5 in typical usage. It can be shown that this non-unity detection efficiency D<1 does not affect any of the foregoing calculations related to the assumption of Poisson-distributed photon arrivals. In fact, for D<1, the Poisson probability of having a photon detection event at time t is given by:

$$f(t) = \lambda_o e^{-\lambda_o T} \quad [5]$$

wherein $\lambda_o$ is the effective photon arrival rate, which is given by:

$$\lambda_o = D\lambda \quad [6]$$

This mathematical equivalence reflects the fact that even if some fraction of the arriving photons is not detected, the resulting distribution of the times of successful detection events is still strictly Poisson-distributed. Thus, all foregoing disclosure and expressions apply by replacing the absolute arrival rate λ by an effective arrival rate $\lambda_o$ which is determined by the detection efficiency D.

Moreover, it turns out that the ability to vary the detection efficiency D can actually provide additional dynamic range to the imager in the high-flux limit. Assuming a nominal operation at D~0.5 in low flux situations, sensing the onset of high flux (as determined by a frame in which a very large fraction of the pixels in the imager registers a detection event) can be used to induce a reduction in D. This is accomplished by reducing the electric field on each GmAPD detector through a reduction of the bias voltage applied to establish this electric field. For example, reducing D from 0.5 to 0.05 would provide another order of magnitude of dynamic range using the photon timing arrival information, increasing the effective dynamic range to six orders of magnitude, or approximately 1,000,000.

Embodiments of the invention described by Expressions [1] and [2] prescribe how the input intensity on a given pixel can be determined from both the count data (particularly for low flux) and the timing data (particularly for high flux). It is also possible to generalize this method to consider measurements not constrained to the duration from t=0 to t=T.

Instead, any interval from $t=T_1$ to $t=T_2>T_1$ can be used to obtain quantities that uniquely correspond to the input pixel intensity.

Applying this generalization, and again using the Poisson probability $f(t)=\lambda_o e^{-\lambda_o T}$, the fraction of counts $F(T_1,T_2)$ that occur between times $T_1$ and $T_2$ can be calculated:

$$F(T_1, T_2) = \int_{T_1}^{T_2} f(t)\,dt = e^{-\lambda T_1} - e^{-\lambda T_2}, \quad [7]$$

Input intensity $\lambda$ can be generalized to $\lambda_o=D\lambda$ to account for a non-unity photon detection efficiency $D<1$ of the detector.

Similarly, the average time of arrival for the count distribution within any arbitrary time interval from $T_1$ to $T_2$ can be calculated as follows:

$$t_{avg} = \frac{\int_{T_1}^{T_2} tf(t)\,dt}{\int_{T_1}^{T_2} f(t)\,dt} = \lambda^{-1}\left[1 + \frac{\lambda T_1 e^{-\lambda T_1} - \lambda T_2 e^{-\lambda T_2}}{e^{-\lambda T_1} - e^{-\lambda T_2}}\right] \quad [8]$$

The more general form for $t_{avg}$ in Expression [8] reduces to Expression [2] if $T_1=0$ and $T_2=T$. These more general forms in Expressions [7] and [8] are useful in situations in which there is a benefit to obtaining counting and timing data within an interval that includes $T_1>0$.

Figure 5:
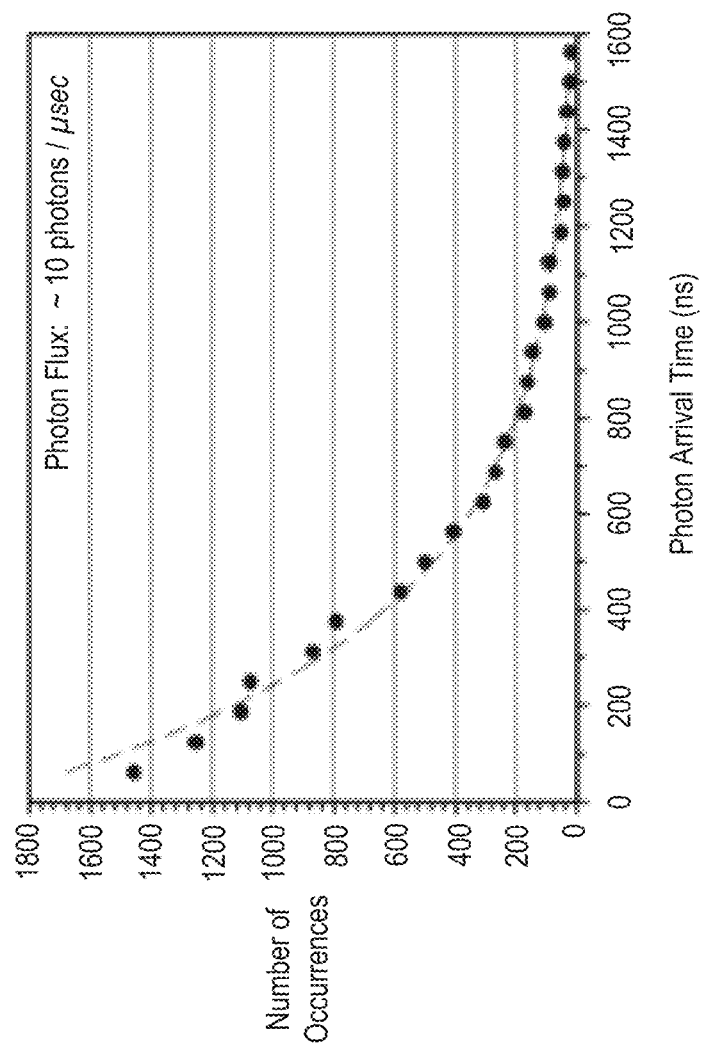
FIG. 5 depicts a histogram of photon arrival times using measured timestamps obtained for a single pixel over 10,000 frames consisting of 10 µs detection periods.

FIG. 5 depicts a histogram of photon arrival times using measured timestamps obtained for a single pixel over 10,000 frames consisting of 10 μs gate durations. The experimental measurements that form the basis for FIG. 5 confirm that in the high flux limit, repeated arrival time measurements agree with the expected distribution $f(t)=\lambda e^{-\lambda t}$ dictated by Poisson statistics. A relatively high photon flux of 10 photons per μs per pixel exhibits the expected exponential decay in the number of occurrences of longer arrival times, with very few photons arriving after about 1000 ns. The average arrival time is 284 ns.

Operation of GmAPD Focal Plane Array 112.

In a disarmed state, every pixel 340 in GmAPD array 216 is biased slightly below the breakdown voltage of the GmAPD using, for example, an external low-noise voltage supply. Voltages are often 70-80 volts, but can extend over a wider range, such as from about 5 to 200 volts. Each imaging frame begins with the arming of all of pixels 340 in array 216 by ROIC 222, by applying an excess bias, such as up to about 4 volts. The period during which the pixels remain armed is the "range gate," with is typically a few microseconds.

Figure 6:
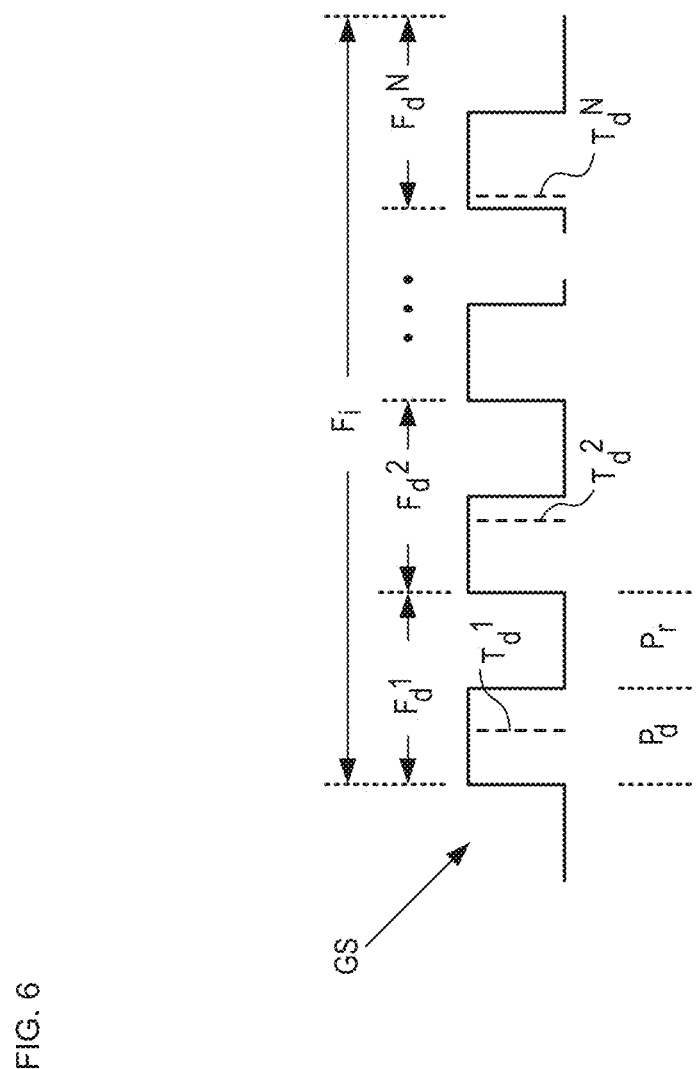
FIG. 6 depicts a bias signal suitable for gating a pixel of a single-photon passive 2d-imager.

FIG. 6 depicts a bias signal suitable for gating pixel 340 as discussed above.

The bias signal, hereinafter referenced "gating signal GS" can be, but is not necessarily, a periodic voltage signal (it can be aperiodic) applied to each pixel 340 in GmAPD array 216 for the purpose of:

arming the GmAPD for detecting a photon during detection period $P_d$; and quenching the GmAPD during reset period $P_r$ for each of N detection frames in image frame $F_i$. In the illustrative embodiment, N=1000. The duration of $P_r$ represents a period of "dead time" for pixel 340, during which it is not operable to detect the arrival of a photon. The duration of each detection period and reset period for pixel 340 is dependent upon the constraints of the application in which GmAPD focal plane array 112 is used. In a typical embodiment, both detection period $P_d$ and reset period $P_r$ are 5 microseconds. A dead time after an avalanche event of approximately 5 microseconds results in an after-pulsing probability of <<1%, which is acceptably low for most applications. In such embodiments, GmAPD focal plane array 112 operates with detection frames $F_D^1$ through $F_D^N$ (referred to, collectively, as detection frames $F_D$) that are each approximately 10 microseconds. Typically, the value of $P_r$ is selected to overcome the inherent afterpulsing effects described above.

In the illustrative embodiment, detection frames $F_D^1$ through $F_D^N$ collectively define image frame $F_i$ that has duration of approximately 10 milliseconds (i.e., 1000 detection frames×10 microseconds per detection frame). GmAPD focal plane array 112 therefore operates at an image frame rate of approximately 100 Hz. One skilled in the art will recognize, after reading this Specification, that the values for detection period $P_d$, reset period $P_r$, and the number N of detection frames in image frame $F_i$ can be any suitable practical value and, therefore, GmAPD focal plane array 112 can operate at any suitable practical image frame rate.

As discussed above, in the operation of a GmAPD focal plane array, there is a trade-off between reducing the number of afterpulses and detection efficiency. The selections of detection period $P_d$ and reset period $P_r$ are based on this trade-off. In the prior-art, this trade-off limits the dynamic range of a GmAPD pixel due to the resultant dead time necessary between detections of single photons. Embodiments of the present invention mitigate this limitation by exploiting knowledge about the time when each detected photon arrives within a detection frame. Specifically, the present invention enables the use of both the number of photons that arrive per pixel in an image frame (which consists of N detection frames), as well as information about when the detected photons arrived, to improve the dynamic range of each pixel.

Figure 7:
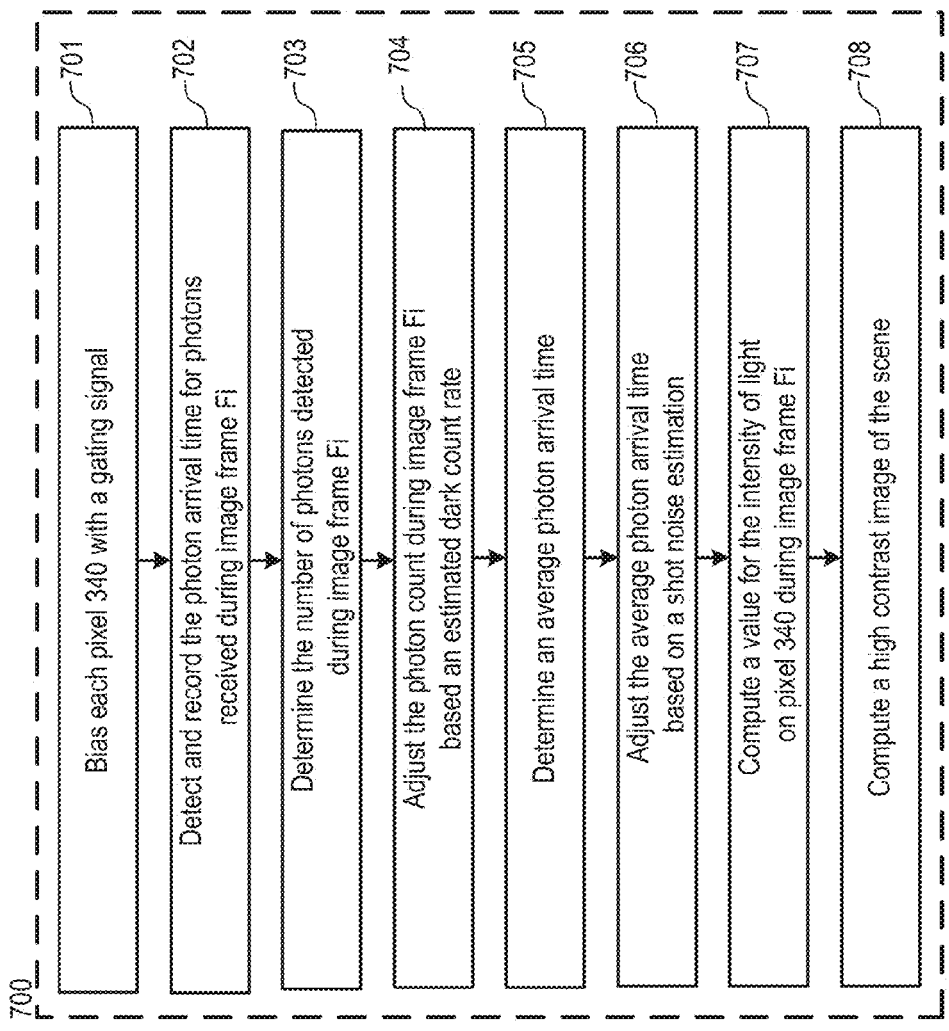
FIG. 7 depicts operations of a method for detecting an image via the single-photon passive 2d-imager.

FIG. 7 depicts operations of a method for detecting an image in accordance with the illustrative embodiment of the present invention. Method 700 begins with operation 701, wherein each pixel 340 is biased with gating signal GS.

At operation 702, a plurality of photon arrival times for photons detected during image frame $F_i$ is recorded and stored by a processor in processor-accessible storage, both of which are operatively coupled with GmAPD focal plane array 112. In some embodiments, the processor is a general-purpose processor that is capable of executing specialized application software for camera 100 and populating, updating, and using the processor-accessible storage. In some alternative embodiments of the present invention, the processor is a special-purpose processor. Processor-accessible storage is a non-volatile, non-transitory memory technology (e.g., hard drive(s), flash drive(s), etc.) that stores specialized application software and detection-related information, whether of an intermediate or archival nature.

At operation 703, the number of photons detected during image frame $F_i$ is determined based on the threshold-detection data and appropriate processing, as is within the capabilities of those skilled in the art. It will be understood that during each detection period $P_d$, each pixel 340 will exhibit some number of false avalanche events that constitute "dark" counts.

At operation 704, the average value of dark counts is subtracted from the photon count for each pixel 340.

As previously discussed, for a typical GmAPD pixel, the dark count rate can be equal to approximately 5 KHz, which yields an average number of 25 dark counts during image frame $F_i$. As a consequence, at operation 704, the number of photon counts recorded by each pixel 340 is reduced by 25, resulting in a more accurate photon count during the image frame.

At operation 705, average photon arrival time $t_{ave}$ within image frame $F_i$ is determined from the raw data collected at operation 701.

During each of detection frames $F_d$, the timing circuitry (e.g., in each pixel of ROIC 222, etc.) determines the arrival time, $t_d$ of a detected photon relative to the leading edge of the portion of gating signal GS that defines that particular detection frame $F_d^j$. One skilled in the art will recognize, after reading this Specification, that the resolution with which the photon arrival times can be determined places a limit on the dynamic range of pixel 340 when the rate at which photons arrive at the pixel is high.

From the photon arrival times determined for the number N of detection frames $F_d^j$ in image frame $F_i$, the average photon arrival time $t_{ave}$ is computed (for image frame $F_i$).

It is notable that average photon arrival time is only one example of a statistical characteristic of photon arrival times that can be employed in determining the light intensity on a pixel in accordance with the present invention. In some embodiments, a different statistical characteristic of photon arrival time is determined in operation 705, such as the distribution of the photon arrival times, other properties of photon arrival times, and the like.

At operation 706, average arrival time $t_{ave}$ is adjusted to account for shot noise associated with the dark counts that occur within image frame $F_i$.

As previously discussed, although the average value of dark counts can be subtracted from the photon count signal for an image frame, fluctuations in the dark count rate give rise to a shot noise that cannot be eliminated from the measured signal. This associated shot noise is given by the square root of the dark count value (approximately 25 in the illustrative embodiment), which gives rise to a value for shot noise of approximately 5. For a shot noise count of 5, the dynamic range of each image frame will be limited to approximately 100 (for a minimum signal-to-noise ratio of 2), based on simply counting detection events for 1000 detection frames.

A quantitative estimate about when photon detections occur within each detection frame $F_i$ can be readily obtained based on the valid assumption that Poisson statistics apply to the distribution of photon arrival times at each pixel 340.

Based on the required dead time following a GmAPD detection event, it is assumed that there can be at most one detected photon arrival per pixel per detection frame $F_d$. As previously discussed, at very low photon flux, the optical intensity is proportional to the number of counts observed. But at very high photon flux, a count will be obtained for every one of the detection frames 308. In this limit of saturated counts at a given pixel, the pixel will provide no useful intensity information; and if illumination conditions result in many pixels being saturated, no contrast information across GmAPD focal plane array 112 can be obtained from the count data.

But, as previously disclosed, the inventor recognized that for high-flux situations, information about the input optical intensity at each pixel 340 can be extracted by analyzing the photon arrival timing information obtained from all 1000 detection frames $F_d^j$. For example, as previously disclosed, assuming a Poisson process, the average arrival time for detection frames of duration T is given by Expression [2]. Again, this expression enables the optical intensity to be determined by simply measuring the average arrival time $t_{avg}$. In some embodiments, this is implemented using a look-up table contained within electronic circuits, such as field-programmable gate arrays.

At operation 707, a value for the intensity of light incident on pixel 340 during image frame $F_i$ is determined. As previously discussed, this value is based on one or more of: (1) the adjusted photon count; (2) the adjusted photon arrival time; and (3) the adjusted photon count and the adjusted photon arrival time.

It is a further aspect of the present invention that, as previously disclosed, methods in accordance with the present invention enable accurate determination of intensity in a manner that is substantially independent of the quantum efficiency of the GmAPDs included in GmAPD focal plane array 112.

At operation 708, the calculated intensities of light on all pixels 340 are used to generate a high-contrast image of a scene imaged onto GmAPD focal plane array 112 during image frame $F_i$.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus including a single-photon 2d passive imager, wherein the imager comprises:
   a plurality of photodetectors capable of detecting single photons;
   circuitry for operating the photodetectors to provide plural detection frames and for determining, for each photodetector of the plurality, arrival time of a photon received at the photodetector; and
   a processor that computes a value for the intensity of light incident on a photodetector of the plurality thereof, wherein:
   (a) when a photon arrival rate is less than a first threshold, the value of intensity is based on a number of photons detected; and
   (b) when the photon arrival rate is greater than a second threshold, the value of intensity is based on arrival time statistics for the photons detected, wherein the arrival time statistics are based on statistical analysis of photon arrival time for each of the plural detection frames, and wherein the photon arrival rate at the first threshold is less than the photon arrival rate at the second threshold.

2. The apparatus of claim 1 wherein the circuitry comprises a read-out integrated circuit having a plurality of pixels, wherein:
   (a) there is a one-to-one correspondence between the photodetectors and the pixels of the read-out integrated circuit;
   (b) each pixel of the read-out integrated circuit comprises a threshold detection circuit for detecting arrival of a photon at the corresponding photodetector; and
   (c) each pixel of the read-out integrated circuit comprises a clock circuit for determining a time at which the photon arrived at the corresponding photodetector.

3. The apparatus of claim 1 wherein the circuitry comprises a counter for counting the number of photons received at each photodetector.

4. The apparatus of claim 1 wherein at least one of the photodetectors is a Geiger-mode avalanche photodiode.

5. The apparatus of claim 1 wherein, when the photon arrival rate is greater than or equal to the first threshold and less than or equal to the second threshold, the processor bases the value of the intensity of light on both (a) the number of photons detected and (b) on arrival time statistics.

6. The apparatus of claim 1 wherein the photon arrival rate at the first threshold is $1\times10^{-4}$ photons per nanosecond per photodetector and the photon arrival rate at the second threshold is $1\times10^{-3}$ photons per nanosecond per photodetector.

7. An apparatus including a single-photon 2d passive imager, wherein the imager comprises:
 a plurality of photodetectors capable of detecting single photons;
 circuitry for operating the photodetectors to provide plural detection frames and for determining, for each photodetector of the plurality, arrival time of a photon received at the photodetector; and
 a processor that computes a value for the intensity of light incident on a photodetector of the plurality thereof, wherein the intensity is based on arrival time statistics for a plurality of photons detected at the photodetector, wherein the arrival time statistics are based on statistical analysis of photon arrival time for each of the plural detection frames, wherein arrival time statistics are selected from the group consisting of average photon arrival time, arrival time distribution, and distribution of the photon arrival times.

8. The apparatus of claim 7 wherein the processor bases the value of the intensity of light on the number of photons detected when a photon arrival rate is less than a first threshold and bases the value of the intensity of light on arrival time statistics when the photon arrival rate is greater than a second threshold, wherein the photon arrival rate at the first threshold is less than the photon arrival rate at the second threshold.

9. The apparatus of claim 7 wherein at least one of the photodetectors is a Geiger-mode avalanche photodiode.

10. A method for determining an intensity of light incident on a photodetector capable of detecting single photons, the method comprising:
 determining an arrival time for each of a plurality of photons received at the photodetector during each of a plurality of detection frames; and
 computing the intensity based on average arrival time for the plurality of photons during the plurality of detection frames.

11. The method of claim 10 wherein the photodetector comprises a Geiger-mode avalanche photodiode.

12. The method of claim 10 further comprising biasing the photodetector with a gating voltage, the gating voltage defining the plurality of detection frames.

13. The method of claim 12 wherein biasing the photodetector further comprises:
 biasing the photodetector with a first gating voltage;
 when a photon arrival rate is above a threshold, reducing the first gating voltage to a second gating voltage.

14. A method for determining an intensity of light incident on a photodetector capable of detecting single photons, the method comprising:
 operating the photodetector to provide a plurality of detection frames, the plurality of detection frames collectively defining an image frame;
 determining an arrival time for each photon received at the photodetector;
 determining the number of photons detected during the image frame; and
 computing the intensity based on statistical analysis of photon arrival time in each detection frame in the plurality thereof when a photon arrival rate is greater than a first threshold and using one or more techniques other than the statistical analysis of arrival times to compute intensity when the photon arrival rate is less than or equal to the first threshold.

15. The method of claim 14 wherein computing intensity further comprises using the number of photons detected by the photodetector as one of the one or more other techniques.

16. The method of claim 15 wherein computing intensity further comprises using the number of photons detected by the photodetector when the photon arrival rate is less than a second threshold that is less than first threshold.

17. The method of claim 16 wherein computing intensity further comprises using both the number of the number of photons detected and the statistical analysis of arrival times when the photon arrival rate is equal to or greater than the second threshold and less than or equal to the first threshold.

18. The method of claim 17 wherein the photon arrival rate at the first threshold is $1\times10^{-4}$ photons per nanosecond per photodetector and the photon arrival rate at the second threshold is $1\times10^{-3}$ photons per nanosecond per photodetector.

19. A method for determining an intensity of light incident on a photodetector capable of detecting single photons, the method comprising:
 determining, for each of a plurality of detection frames, an arrival time for each of a plurality of photons received at the photodetector; and
 computing the intensity based on Poisson statistics of the arrival times of the plurality of photons for the plurality of detection frames.

20. A method for computing an image of a scene, the method comprising:
 providing a photodiode focal-plane array having a first pixel and a second pixel, the first pixel comprising a first single-photon photodetector and the second pixel comprising a second single-photon photodetector;
 biasing the first single-photon photodetector with a periodic gating signal, wherein a single period of the gating signal defines a detection frame and a plurality of detection frames defines an image frame;
 biasing the second single-photon photodetector with the gating signal;
 receiving light comprising a first plurality of photons at the first single-photon photodetector during the image frame;
 receiving light comprising a second plurality of photons at the second single-photon photodetector during the image frame;
 determining an arrival time for each photon of the first plurality and second plurality of photons;
 computing a first intensity for the light received at the first single-photon photodetector during the image frame, the first intensity being based on statistics of the arrival times of the first plurality of photons;
 computing a second intensity for the light received at the second single-photon photodetector during the image frame, the second intensity being based on statistics of the arrival times of the second plurality of photons; and
 determining an intensity contrast between the light received at the first single-photon photodetector and the second single-photon photodetector during the image frame.

21. The method of claim 20 wherein the first intensity is computed based on an average arrival time for the plurality of photons.

22. The method of claim 20 wherein the first intensity is computed based on a distribution of photon arrival times for the plurality of photons.

23. The method of claim 20 and further comprising reducing a voltage of the gating signal when a photon arrival rate is above a threshold.

24. The method of claim 20 wherein the first intensity is computed based on a determination of Poisson statistics of the arrival times of the first plurality of single photons.

25. The method of claim 20 wherein at least one of the first single-photon photodetector and the second single-photon photodetector is a Geiger-mode avalanche photodiode.

26. The method of claim 20 further comprising:

determining the number of photons detected during the image period at the first single-photon detector;

determining the number of photons detected during the image period at the second single-photon detector; and further wherein:

computing a first intensity comprises:
 (a) basing the first intensity on the number of photons detected at the first single-photon detector when a photon arrival rate is less than a first threshold; and
 (b) basing the first intensity on the statistics of arrival time at the first single-photon detector when the photon arrival rate is greater than a second threshold; and computing a second intensity comprises:
 (a) basing the second intensity on the number of photons detected at the second single-photon detector when the photon arrival rate is less than the first threshold; and
 (b) basing the second intensity on the statistics of arrival time at the second single-photon detector when the photon arrival rate is greater than the second threshold, wherein the photon arrival rate at the first threshold is less than the photon arrival rate at the second threshold.

27. The method of claim 26 and further wherein when the photon arrival rate is equal to or greater than the first threshold and less than or equal to the second threshold:
 (a) computing the first intensity comprises basing the first intensity on both the number of the number of photons detected and the statistics of arrival times at the first single-photon detector; and
 (b) computing the second intensity comprises basing the second intensity on both the number of the number of photons detected and the statistics of arrival times at the second single-photon detector.

28. The method of claim 26 and further comprising reducing a voltage of the gating signal when the photon arrival rate is above a third threshold.

* * * * *